Figure 3:
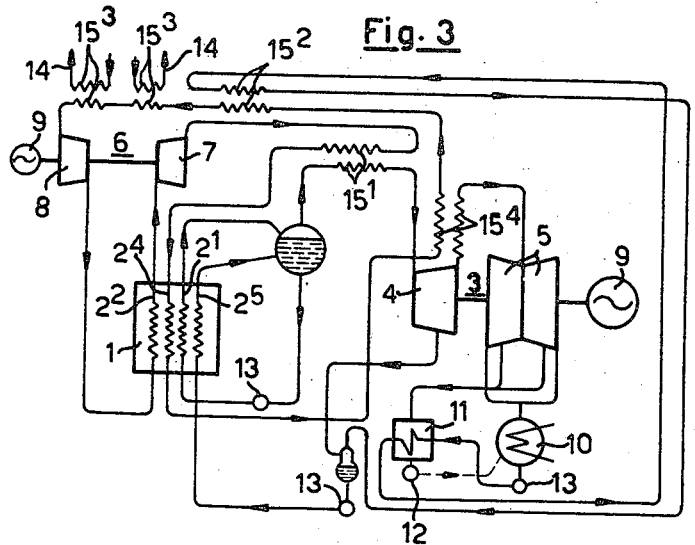

Dec. 18, 1962   F. FLATT   3,069,342
HEAT EXCHANGE ARRANGEMENT FOR NUCLEAR POWER PLANT
Filed Jan. 27, 1958   3 Sheets-Sheet 1
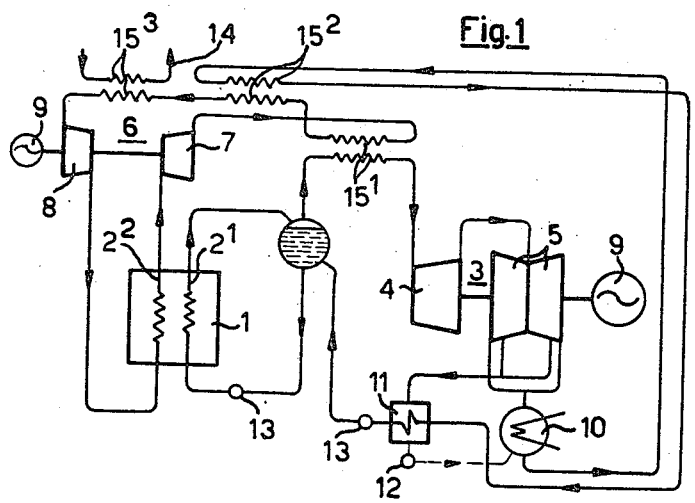
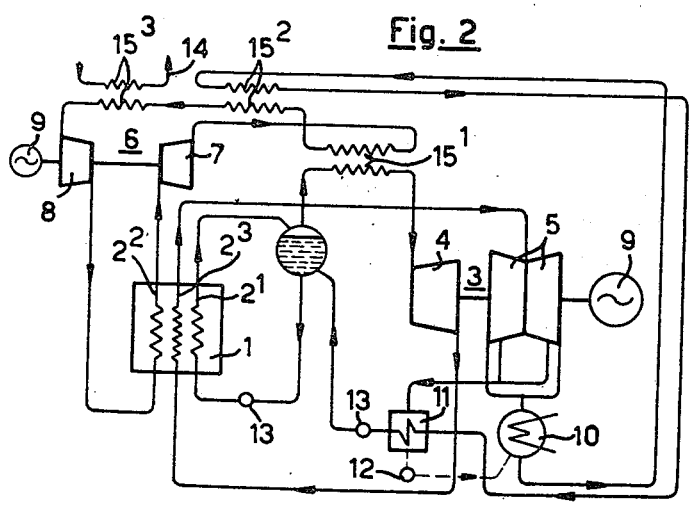
Friedrich Flatt
INVENTOR.
BY Dodge and Son
Attorneys Dec. 18, 1962   F. FLATT   3,069,342
HEAT EXCHANGE ARRANGEMENT FOR NUCLEAR POWER PLANT
Filed Jan. 27, 1958   3 Sheets-Sheet 3

Friedrich Flatt
*INVENTOR.*
BY Dodge and Sons
Attorneys

United States Patent Office 3,069,342
Patented Dec. 18, 1962

3,069,342
HEAT EXCHANGE ARRANGEMENT FOR NUCLEAR POWER PLANT
Friedrich Flatt, Zurich, Switzerland, assignor to Escher Wyss Aktiengesellschaft, Zurich, Switzerland, a corporation of Switzerland
Filed Jan. 27, 1958, Ser. No. 711,528
Claims priority, application Switzerland Feb. 5, 1957
4 Claims. (Cl. 204—193.2)

This invention relates to a heat exchange arrangement for the transfer of heat generated in an atomic nuclear reactor to the circulating working medium of a thermal power plant.

If in such a plant the medium to be heated is at a very high pressure, it cannot be heated in the reactor to a temperature as high as is necessary for a good thermal efficiency and favourable operating conditions for the working medium. In a known plant using steam as the working medium, the steam heated by the heat from the reactor is superheated to a higher temperature by one of the hitherto usual fuels. However, this involves the use of additional equipment and the provision of two kinds of energy carriers.

The invention aims to avoid these disadvantages and to use only atomic energy. For the heat transfer from the nuclear reactor to the working medium of the thermal power plant, the invention provides for this purpose a heat exchange arrangement which comprises at least two heat exchange systems through which the working medium to be heated flows serially, each system having a flow path for heat exchanging medium under pressure leading through said nuclear reactor, the medium pressures in these two flow paths differing from one another and the temperature of the medium having the lower pressure being higher than that of the medium having the higher pressure.

The drawing shows examples of the invention in simplified form.

FIGURES 1 to 6 illustrate diagrams of these examples.

The thermal power plants shown comprise a nuclear reactor 1 having paths $2^1$, $2^2$, $2^3$ etc. for heat exchanging media, which take heat from the reactor. Steam turbines 3 with high-pressure stages 4 and low-pressure stages 5 as well as gas turbine units 6 with a turbine 7 and compressor 8, drive electric generators 9. The steam engines 3 have condensers 10, heat exchangers 11 for feed-water preheating and steam traps 12. Pumps 13 are included in the circuits for the heat exchanging media. The circuits are connected to each other and to heat users via heat exchangers $15^1$, $15^2$, $15^3$ etc.

The power plant according to FIGURE 1 comprises a circuit for the working medium of a heat engine, namely the steam turbine 3. For the transfer of heat from the reactor 1 to the high-pressure working medium of the steam turbine 3 there are provided the two separate flow paths $2^1$ and $2^2$ for heat exchanging media, which lead through the reactor 1. The heat exchanging medium flowing through the path $2^1$ is the working medium itself of the steam turbine circuit. A gaseous intermediate heat carrier, such as $CO_2$ or helium, the pressure of which is lower than that of the medium led along the path $2^1$ is guided along the second path $2^2$, through the reactor 1 for receiving heat. It is thereby heated up to a higher temperature than that of the working medium flowing through path $2^1$, this being possible, because the medium pressure along the flow path $2^2$ is lower than that along the flow path $2^1$ and therefore not as high a strength of the material of the conduits as in the flow path $2^1$ is required.

The gaseous intermediate heat carrier is circulated serially through the second flow path $2^2$ of the reactor 1 and then through one of the flow paths of the surface heat exchanger $15^1$. It there delivers a part of the heat received from the reactor to the high pressure working medium of the steam turbine circuit which medium has been preheated along the first flow path $2^1$ of the reactor. The arrangement is such that at least a part of the high pressure working medium flows serially through the flow path $2^1$ of the reactor and then through the other flow path of the heat exchanger $15^1$.

Before the intermediate heat carrier (in FIGURE 1), which is led through the reactor 1 along the second path $2^2$, reaches the heat exchanger $15^1$, it performs work in the turbine 7 of the gas turbine unit 6. After flowing through the heat exchanger $15^1$, this heat carrier transmits heat to feed water in the exchanger $15^2$ and to the heat user 14 in the exchanger $15^3$. It is then compressed in the compressor 8 and returned to the flow path $2^2$ of the reactor 1. The steam turbine 3 and the gas turbine unit 6 drive the generators 9.

In the thermal power plant illustrated in FIGURE 2, there is an additional path $2^3$ through the reactor 1, in contrast to the plant in FIGURE 1. The working medium from the high-pressure stage 4 of the steam turbine 3 is subjected to intermediate superheating along this path $2^3$ before entering the low-pressure stage 5. Since the working medium has already expanded to a lower pressure at this stage, it can be heated to the required high temperature directly in the reactor 1. The intermediate superheating of the working medium taking place directly in the reactor along the path $2^3$ can be higher than the superheating of the live steam carried out in the heat exchanger $15^1$.

In the plant shown in FIGURE 3, paths $2^4$ and $2^5$ lead through the reactor in addition to the paths $2^1$ and $2^2$. The path $2^5$ serves to preheat the feed water of the steam turbine circuit. The intermediate heat carrier which is led through the reactor 1 along the second path $2^2$, is led through the reactor 1 for a second time along the path $2^4$ after it has performed work in the gas turbine 7 and transmitted heat to the working medium to be supplied to the high-pressure stage 4 of the steam turbine 3. This heat carrier, which has thus been brought to a higher temperature again, serves to intermediate-superheat the working medium of the steam turbine 3 in the heat exchanger $15^4$, and then, similar to FIGURES 1 and 2, is used in the heat exchangers $15^2$ and $15^3$ to preheat feed water or transmit heat to the heat user 14, respectively, is compressed in the compressor 8 and returned to path $2^2$ of the reactor 1.

Figure 4:
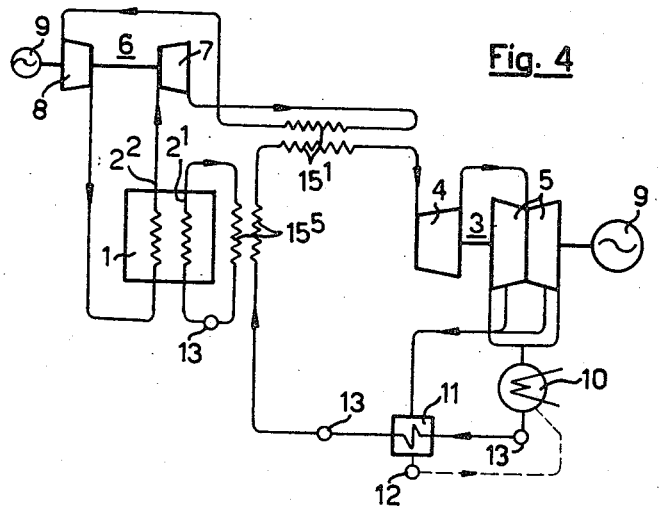

The thermal power plant shown in FIGURE 4 differs from the aforementioned ones in that the working medium of the steam turbine 3 is not heated directly along the path $2^1$ through the reactor 1, but heat from the reactor 1 is transmitted along this path $2^1$ to an intermediate heat carrier which is in heat-exchange relationship with the working medium in the heat exchanger $15^5$. The intermediate heat carrier is a high pressure medium, for example pressurized water. In view of the difficulties mentioned earlier, heating to a sufficiently high temperature along the first path $2^1$ can also not be achieved in this case. It is possible only with the aid of the intermediate heat carrier flowing through the reactor 1 along the path $2^2$.

Instead of using a gaseous medium as the intermediate heat carrier it may be more advantageous to dispense with a gas turbine and to use a liquid medium, preferably a metal, as the heat carrier in the second path through the reactor.

Figure 5:
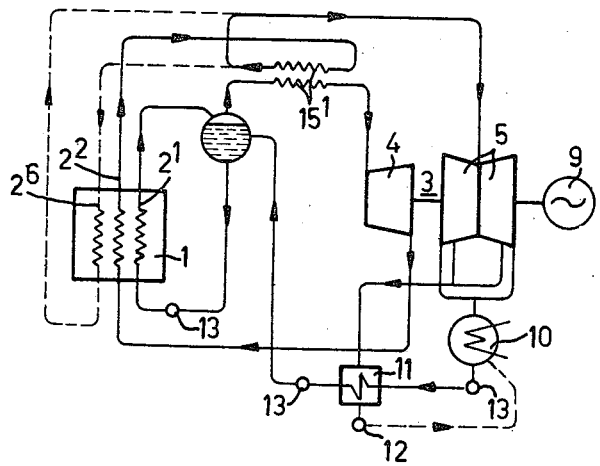

According to FIGURE 5, the heat carrier led through the reactor 1 along the second path $2^2$ is the working medium of the heat engine, i.e. of the steam turbine 3. This working medium is withdrawn from the outlet of the high-pressure stage 4 of the turbine 3, i.e. in a low pressure state, and heated along the path $2^2$. Thereafter it superheats the working medium heated along the first path $2^1$ and is then fed to the low-pressure stage 5. As shown in broken lines in FIGURE 5, the working medium could first be re-fed through the reactor 1 along a path $2^6$ in which it is reheated before entering the low-pressure stage 5.

Figure 6:
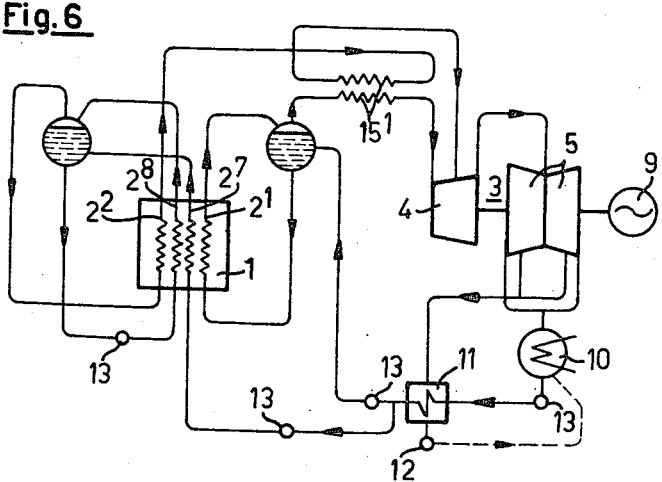

In the thermal power plant shown in FIGURE 6, part of the low-pressure feed water is tapped from the working medium circuit, and is preheated, evaporated and superheated in the reactor 1 along the paths $2^7$, $2^8$ and $2^2$, respectively. It then serves to superheat, in the heat exchanger $15^1$, the working medium evaporated along the path $2^1$ and is thereafter returned to the steam turbine 3 at a corresponding low-pressure portion of the high-pressure stage 4. High-pressure working medium and low-pressure working medium are thereby led in parallel through the first and second reactor flow path, respectively.

In all the illustrated examples, the heat engines, to the working media of which heat is transmitted in the reactor along the first path $2^1$, are steam turbines. However, the plants may incorporate other heat engines in lieu of the steam turbines, for example, gas turbines.

The examples provide for a single reactor having the various paths for the heat carriers. The reactor could, however, be subdivided into several small reactors, each providing one of the paths, or into two reactors—one for the paths carrying heat exchanging media at a higher pressure and the other for the paths carrying those at a lower pressure.

What is claimed is:

1. In a nuclear thermal power plant including an atomic nuclear reactor and a closed circuit containing circulating working medium that receives heat generated in the reactor and having means for expanding the heated working medium while doing work, the improvement which comprises means for transferring heat from the reactor to the working medium to thereby raise its temperature to an intermediate value; a heat transfer circuit including a flow path through the reactor for a gaseous heat exchanging medium under pressure in which the gaseous heat exchanging medium absorbs heat generated in the reactor and its temperature is raised above said intermediate value, and means for expanding the gaseous heat exchanging medium while doing work after it leaves the reactor flow path; a gaseous heat exchanging medium in the heat transfer circuit; and a surface heat exchanger located outside the reactor and connected with both the closed circuit and the heat transfer circuit, the heat exchanger being arranged to transfer heat from the gaseous heat exchanging medium in the heat transfer circuit at a point downstream of the reactor flow path to the partially heated working medium in the closed circuit, the pressure of the medium in the reactor flow path of the heat transfer circuit being lower than the pressure of the working medium being heated in the heat exchanger.

2. In a nuclear thermal power plant of the type specified in claim 1 in which the means for expanding the heated working medium includes serially arranged turbine stages, the improvement defined in claim 1 which includes conduit means for leading working medium between consecutive stages into said heat transfer circuit; and wherein the expanding means in the heat transfer circuit is located downstream of the surface heat exchanger and comprises one of the later turbine stages, whereby the gaseous heat exchanging medium is working medium at reduced pressure.

3. The improvement defined in claim 2 including a second flow path through the reactor in which a medium may absorb heat generated in the reactor; and in which the conduit means leads the working medium leaving the first reactor flow path through the second reactor flow path before it enters said one of the later turbine stages.

4. The improvement defined in claim 1 in which the heat transfer circuit includes a compressor for compressing the gaseous heat exchange medium before it enters said reactor flow path; and in which the expanding means in the heat transfer circuit is a gas turbine connected in driving relation with the compressor.

References Cited in the file of this patent

UNITED STATES PATENTS

| | | |
|---|---|---|
| 2,539,255 | Karrer et al. | Jan. 23, 1951 |
| 2,787,593 | Metcalf | Apr. 2, 1957 |
| 2,812,303 | Daniels | Nov. 5, 1957 |
| 2,865,827 | Dwyer | Dec. 23, 1958 |

OTHER REFERENCES

"General Electric Review," November 1955, pp. 19–22.
"Facts," September 1955, 3 pages Digest B.